INVENTORS
MARK R. COLBY
OLIVER D. COLVIN
WERNER H. HAHNE
BY
ATTORNEY

June 6, 1939.  M. R. COLBY ET AL  2,160,831
METHOD OF AND APPARATUS FOR PREVENTING DAMAGE
TO CARGO IN CARGO COMPARTMENTS
Filed March 29, 1939  3 Sheets-Sheet 2

INVENTORS
MARK R. COLBY
OLIVER D. COLVIN
WERNER H. HAHNE

BY G. Wright Arnold
ATTORNEY

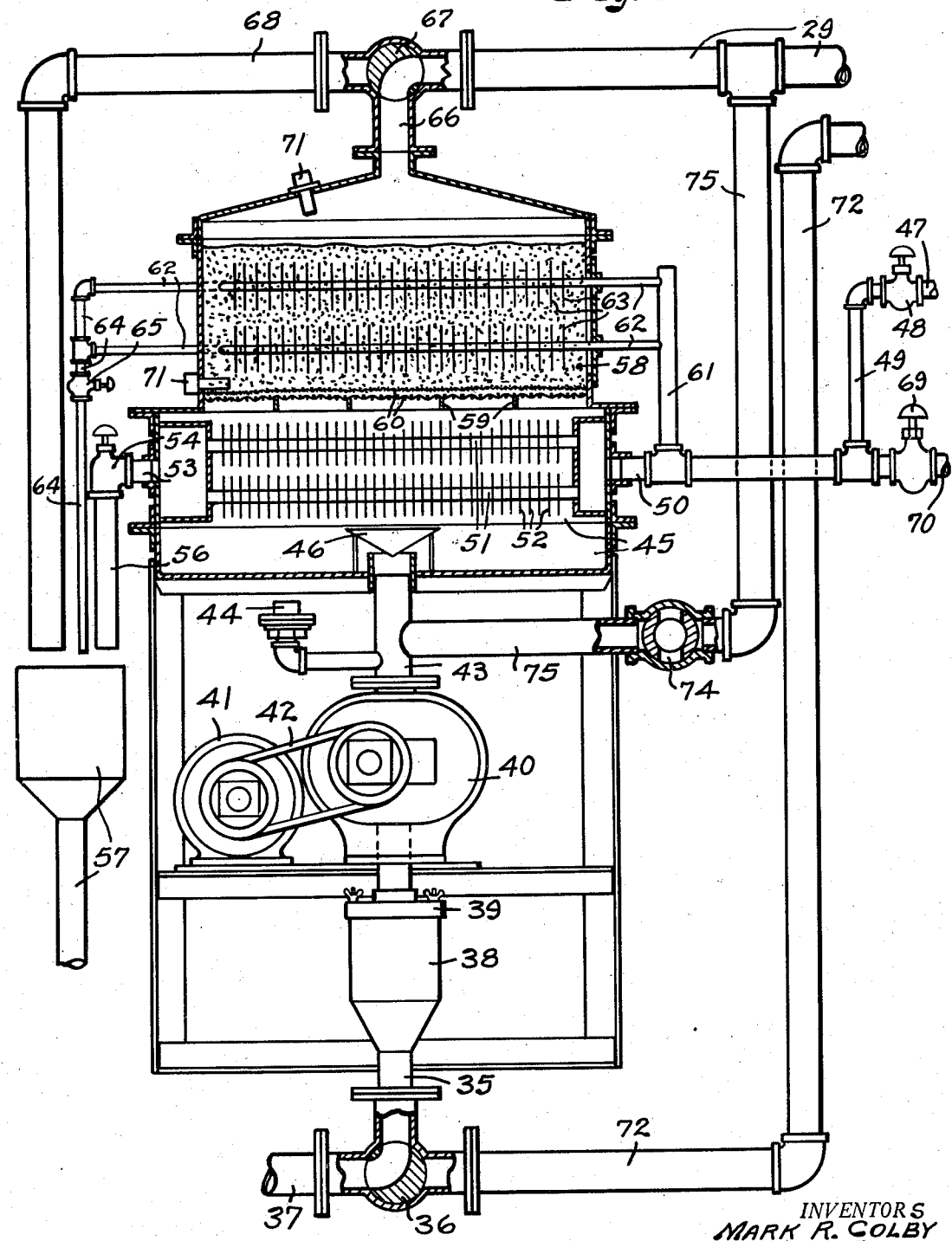

Patented June 6, 1939

2,160,831

UNITED STATES PATENT OFFICE 2,160,831

METHOD OF AND APPARATUS FOR PREVENTING DAMAGE TO CARGO IN CARGO COMPARTMENTS

Mark R. Colby, Seattle, Wash., Oliver D. Colvin, Oconomowoc, Wis., and Werner H. Hahne, New York, N. Y.; said Colvin and said Hahne assignors to said Colby as trustee Application March 29, 1939, Serial No. 264,820

8 Claims. (Cl. 98—52)

This invention relates to a method of and apparatus for preventing damage to cargo in cargo compartments, as ships' general cargo holds, warehouses, and similar storage closures.

This application is a continuation of our copending application Serial No. 81,452, filed May 23, 1936, entitled "Method of and apparatus for preventing damage to cargo in cargo compartments".

For the purpose of clearness and definiteness of description, the invention and its application will only be discussed in connection with a ship's general cargo hold or compartment but it is to be understood that the invention is not to be limited to any such specific application, but is applicable where similar problems exist in whole or in part.

Heretofore attempts have been made to minimize the damage to cargo in general cargo compartments. Such prior attempts have generally sought to solve the problem by increasing or controlling the outside fresh air supply to the holds. For example, ships are provided with a plurality of ventilators, such as cowls, and in attempting to protect the cargo from damage, the ventilators are opened or adjusted to provide a desired inlet of outside air into a hold. Also positive power driven blower systems are used in conjunction with the ventilators to further increase the supply of outside air in a hold. In addition to the ventilation of a hold, which has heretofore been used, other attempts to protect the cargo involved the use of an absorbent material over the cargo, such as paper, or the use of a relatively water-resistant material over the cargo, as water-proof canvas as a water shedding means. Despite all the prior attempts, the damage to cargo aboard ships has remained a problem of alarming proportions and the annual loss involves many hundred thousands of tons of cargo.

One feature of this invention involves the discovery that the source of greatest damage to cargo aboard ship is what may be termed "ship's cargo sweat", i. e., the activities of moisture and particularly the condensation thereof on cargo and parts of the ship's structure. This ship's sweat occurs in a general cargo compartment whenever the dewpoint of the air is higher than the temperature of the substances it contacts, such as the cargo or the bounding surfaces of the cargo compartment.

In this connection, the term dewpoint refers to the temperature below which a particular sample of air will begin to release its moisture in the form of dew or other precipitation. Air is capable of holding increasing amounts of moisture with increasing temperatures. It does not follow that with increasing temperature air does carry this increased moisture. Relative humidity, probably better termed percentage of saturation, is the percentage of moisture actually present in a sample of air at a given temperature compared to the maximum amount of moisture it would hold if it were saturated at that given temperature. Therefore dewpoint and relative humidity are not to be confused.

In the event that the bounding surfaces of the general cargo compartment become cooler than the dewpoint of the air in the cargo compartment then there will be condensation on the bounding surfaces of the ship which will drip onto the cargo. If the cargo is of a temperature below that of the dewpoint in the cargo compartment then condensation will take place on the cargo. Also if the temperature of the cargo is maintained relatively cool it will be impossible to unload such cargo at discharge ports having an atmospheric dewpoint higher than the temperature of the cargo without precipitation on the cargo. In other words, there may be precipitation on the cargo while it is in the cargo compartment unless the dewpoint of the air therein is lower than the temperature of the bounding surfaces of the cargo and of the cargo compartment, and at the same time upon discharge of the cargo, unless the cargo is of a temperature above the dewpoint of the atmosphere at the port of discharge, there will be condensation upon the cargo.

In addition to the moisture which is carried into the cargo compartment with the introduction of fresh outside air, moisture is brought into the hold when rain, snow, hail, etc., are permitted to enter directly through open hatches during loading. Also cargo on docks and while loading may be exposed to the elements and the cargo will serve as a carrier for moisture into the hold.

Moisture on the cargo causes damage to almost every type of cargo. For example, the labels on canned goods are loosened and the containers themselves rust; steel cargo aboard the ship will rust; flour, sugar, saltpeter and other similar goods will cake; bulk grain will germinate, tending to result in spontaneous heating and almost every variety of cargo will be in a measure adversely affected. Also moisture on the bounding surfaces of the ship's cargo compartment causes damage thereto.

Opening the holds to the atmosphere, by cowls, open hatches, etc., is a potential source of probable damage to cargo, and in practice may often cause more harm than good. Salt laden moisture or large quantities of water may be and often are delivered into the holds by way of such openings, thereby causing, or considerably increasing the damage to almost every type of cargo. In this connection it is well recognized that salt spray is an extremely potent corrosive agent.

It must further be remembered that if a hold is ventilated by the usual method of open hatches, cowls, etc., that a change in the operative position of the hatches and cowls is necesary with changes in the condition of the wind and weather.

Heavy weather not only requires a change in the operative positions of the cowls and hatches, but also requires conflicting operative positions. To keep the water out of the holds, the hatches and cowls should be closed. At the same time the decrease in outside temperature, which generally is present in heavy weather, cools the ship's structure and thus raises the relative humidity in the hold and therefore maximum ventilating conditions (by opening the cowls and hatches) are needed to prevent precipitation of moisture on the structure of the ship and onto the cargo. These irreconcilable conditions demonstrate that ventilation by open holds and cowls is impractical and inoperative at the times of greatest need.

Changes in the relative wind direction, either from change of course of the vessel or from a change in the wind direction itself, require a change in the operative position of the cowls or the hatches. Besides the work necessary for such constant changes, the same are often extremely perilous to life and property, as for example many lives have been lost trimming cowls or closing hatches in heavy weather.

In the practice of our invention, we go contrary to the established practice of providing a ventilated hold and provide a substantially closed hold. This may be done by removal of all cowls or ventilators, with the exception of two ventilators for each hold which are normally closed and which may be opened for purposes hereinafter set forth, and sealing of all openings as securely as possible, thus eliminating the above mentioned damage to cargo and peril to personnel. If ships are being built in accordance with our invention, care should be used to eliminate openings and tight sealing hatch covers should be provided so that the hold will be substantially closed. The air in said closed hold is dried to reduce the moisture content of such air which reduces the dewpoint and eliminates the said "ship's sweat" and deposit of moisture on the cargo and ship's structure. Also such reduced dewpoint is maintained.

In view of the fact that a hatch over a ship's hold and other openings to the hold provide many practical difficulties to make the same completely air-tight, and a certain amount of fresh air will tend to be drawn into this hold, we provide means to substantially overcome this tendency. As the temperature of the air within a ship's hold cools and the pressure lowers, the air outside tends to pass into the ship's hold by way of openings around the hatch coverings and similar places. To overcome any tendency of such lowering of pressure, due to lowering of temperature, we preferably provide for the definite introduction of a certain amount of dry air into a ship's hold, which creates a positive pressure tending to continuously cause the air within the ship's hold to escape therefrom by way of openings around the hatches, or if necessary specially provided vents, etc., and thereby prevent outside air from entering the hold.

In other words, it is the object of our invention to provide a relatively closed circulation of the air within the ship's hold and to provide means for the introduction of a substantial stream of relatively dry air to displace relatively wet air from the cargo compartment, by way of openings, usual leaks, etc., and thereby lower the dewpoint of air within the ship's hold.

It is a further object to provide a slight pressure within the ship's hold to prevent the introduction of air into the hold by way of the usual leaks.

The temperature and humidity conditions involved in a ship's general cargo hold are entirely dissimilar to conditions which may be found on land or refrigerated compartments and we find that air conditioning equipment which has been heretofore used on land equipment may not be practically and successfully employed to solve the moisture condition problem in a general cargo hold of a ship. In the first place, the temperature of the water which is adjacent the ship's hull usually varies as the ship moves from place to place. This variation may be extremely great and rapid as the ship moves into or out of ocean or river currents, such as from the Labrador current to the Gulf Stream or from the Gulf of Mexico to the Mississippi River. At the same time the temperature of the air surrounding the vessel may vary but not in accordance with the temperature of the water. Also the moisture content of the outside air may vary considerably during any one day. Also the cargo is loaded in an extremely compact condition so that the cargo will tend to retain a temperature equal to the temperature at which the cargo was stowed and the cargo temperature will not change in proportion to the temperature of the atmosphere. These variable conditions, together with the large volumes of air involved in a ship's general cargo hold, make it impossible, for practical purposes, to attempt to air condition the entire general cargo hold by air conditioning equipment similar to that used on land. Also if a hold is insulated as in a refrigerated compartment, the compartment will not serve to transmit the outside temperature to the cargo. In other words, if the cargo is cool it may have a temperature less than the dewpoint of the air at the port of discharge resulting in condensation of moisture on the cargo. It is a decided advantage in our invention that the temperature of the cargo shall be subject to external air temperatures to condition the cargo for discharge. The discovery that substantially all damage could be prevented by substantially drying the air in the hold is most important in the practicing of our invention. In using this discovery in our invention, we provide means to dry the air adjacent the bounding surfaces of the cargo compartment and the bounding surfaces of the cargo block. In the practice of our invention, the bounding surfaces of the cargo compartment provide heat transfer from external temperature conditions to within the cargo compartment. The interior of the compartment is substantially closed from communication with the outside temperature. Air is drawn out of the compartment at one location and delivered directly in a duct to a second location within the compartment. The air is then circulated within the compartment adjacent one of the bounding surfaces which provide heat transfer. Then the moisture content of the circulated air is maintained at a dewpoint below that at which moisture would be condensed as by contact with the bounding surfaces of the compartment cooled by external temperature conditions. Preferably the circulation of air within the compartment takes place upwardly and/or downwardly through vertically extending spaces between the cargo block and the side bounding walls and horizontally between the cargo block and the top bounding wall. Preferably also a positive pressure is employed to prevent what may be termed "breathing of the ship" which is due to atmospheric changes of temperature resulting in changes of pressure in the cargo compartment so that the pressure within the ship's hold is above or below the adjoining atmospheric pressure. Our invention permits athwartship ventilation of the hold as distinguished from fore and aft ventilation attempted by the usual cowl systems. Therefore the usual frames and thwartship beams of the ship offer no obstacles and problems in our invention, but positively aid in our invention.

The above mentioned general objects of our invention, together with others inherent in the same, are attained by the devices illustrated in the following drawings, the same being preferred exemplary forms of embodiment of our invention, throughout which drawings like reference numerals indicate like parts:

Fig. 5 is a fragmentary elevation with parts in section of an air drying unit which is applicable to this invention.

Figure 1:
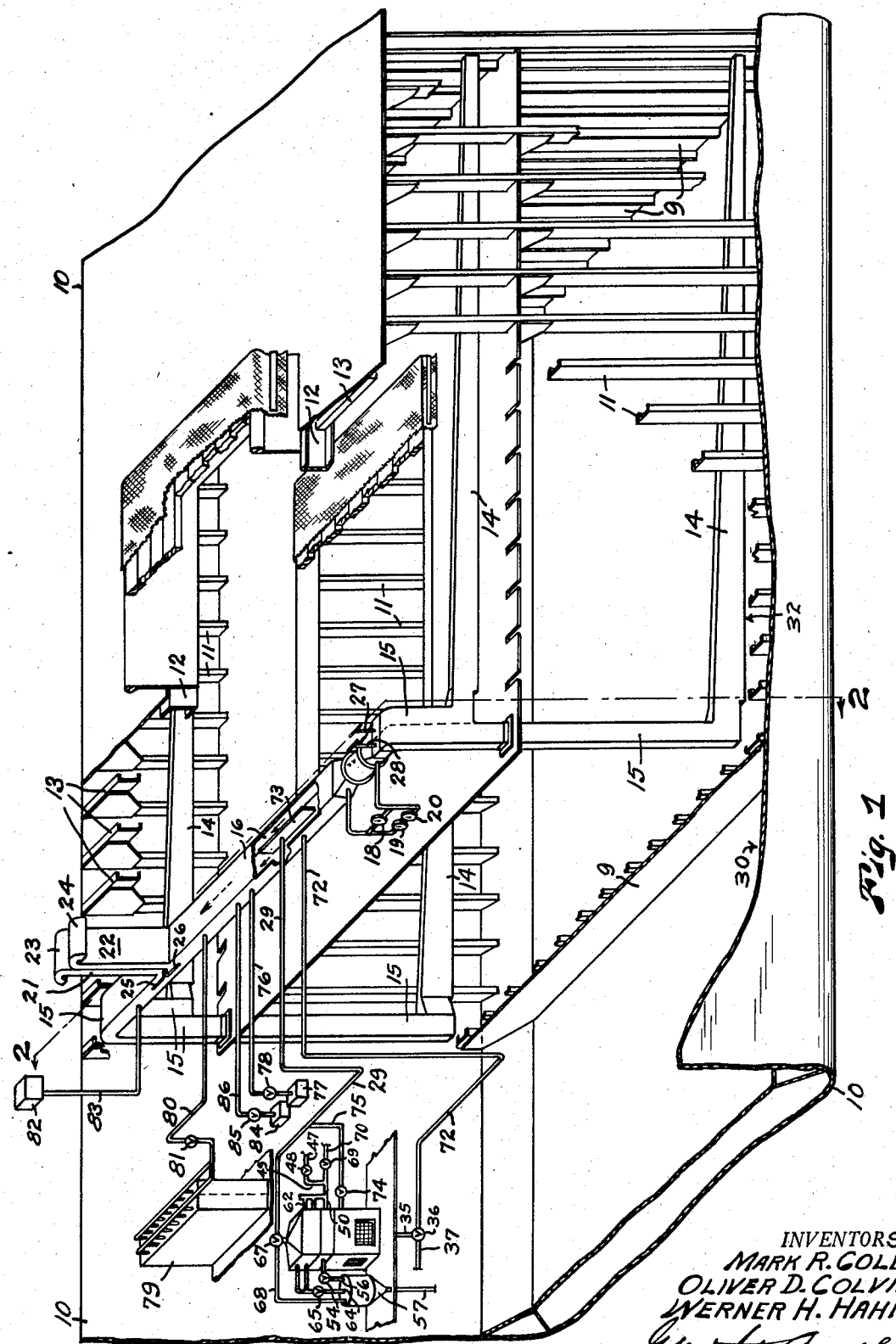
Figure 1 is a fragmentary perspective view, with parts broken away for the purpose of clearness, showing our invention applied to a ship, such as a ship having two superimposed holds.
Figure 2:
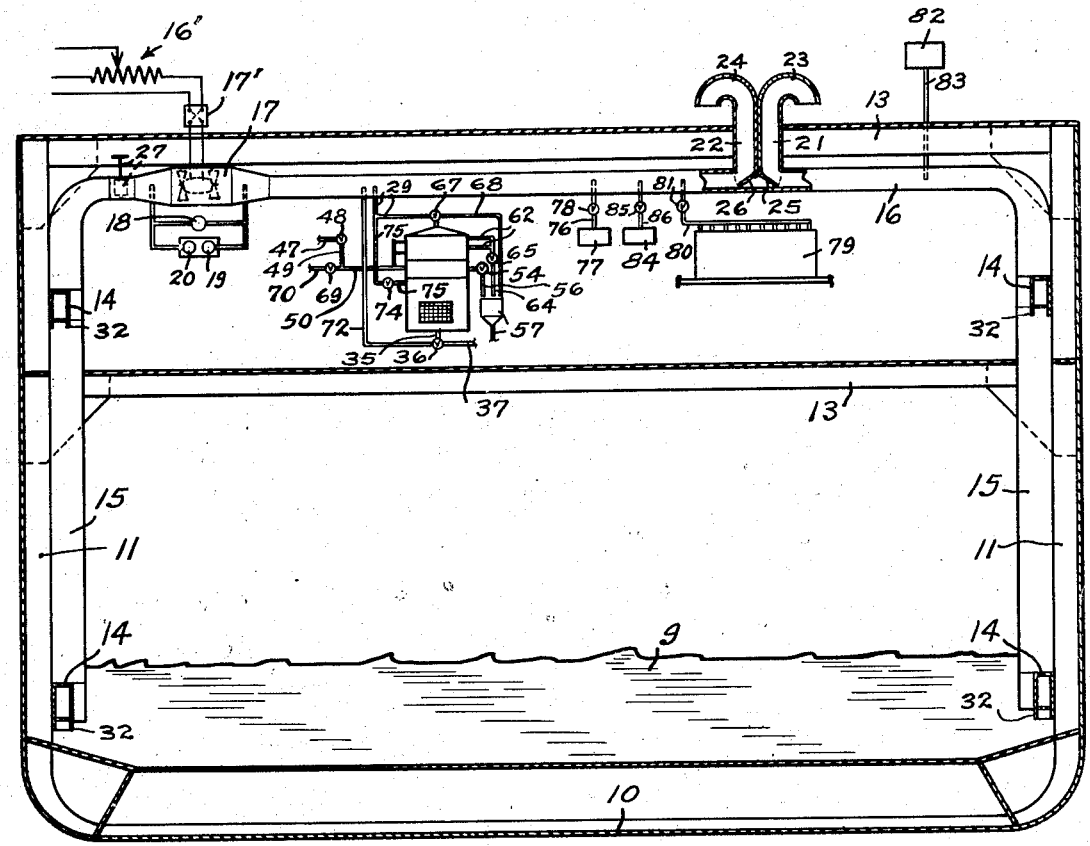
Fig. 2 is a sectional view, with parts broken away, taken substantially on line 2—2 of Fig. 1, with parts indicated diagrammatically.

Referring to Fig. 1 of the drawings, the ship's hull, which is broken away for purpose of illustration, is indicated generally by 10. The hull 10 is supported by the frames 11, the girders 12 and beams 13. The construction of the ship is only generally illustrated and described as the same constitutes, of course, no part of this invention. Also for the purpose of brevity and clearness of description, only two compartments or holds, formed between watertight bulkheads 9, of a ship having two decks is shown. The ducts 14, which serve as either inlet or outlet ducts, are preferably positioned longitudinally of and adjacent the sides of each hold. These ducts 14 are preferably of the construction shown in Figs. 3 and 4 of the drawings. The ducts 14 are connected by risers 15 with a common duct 16. This common duct 16 is provided with an air impeller 17 disposed in said common duct 16. This impeller 17 may be of any usual type and is preferably of variable speed and reversible so that the flow of air may be governed and the direction of flow of air in the duct 16 may be reversed at desired intervals. In Fig. 2 of the drawings rheostat 16' and reversing switch 17' are diagrammatically illustrated to accomplish such purposes.

Preferably pressure gauge 18 is provided to indicate the difference in pressure of the air in the common duct 16 between the inlet and outlet of said impeller 17. Also the temperature gauge 19 and hygrometer 20 are provided so that the moisture content of the air which is being drawn from the ship's hold may be determined from time to time. Conduits 21 and 22 are connected with weather-proof ventilators 23 and 24, respectively, so that the same are connected with the atmosphere. Valves 25 and 26 may be adjusted to connect or disconnect the conduits 21 and 22 from the common duct 16. By the operation of such valves 25 and 26, either of the conduits 21 or 22 may serve as an inlet duct for outside air and the other of said ducts will serve as an outlet or exhaust for air from the common duct 16. The valves 25 and 26 are adjusted in normal operation to disconnect the conduits 21 and 22 from the atmosphere and the air is circulated in a closed circuit within a hold. Valves 27 and 28 may be provided to confine the circulation of air to one hold or to the other or permit the circulation of air to occur in both holds. The air is circulated in a closed circuit adjacent to the sides and top of the cargo compartment and between such bounding surfaces and the bounding surfaces of the cargo block. As the air is thus circulated in a closed circuit within a hold, we have discovered that it may be properly dried by the inflow of predetermined amounts of substantially dry air delivered into the common duct 16 as by way of the conduit 29. We have further discovered that if the source of such dried air is external of the hold, that a substantially small amount of dried air injected into the common duct 16 will not only serve to lower the dewpoint of the air in the hold, but will serve to create a positive pressure in the hold, thereby preventing undesired "breathing" or inflow of outside air into the hold via openings around the hatches and similar places. One form of air drying unit which we have found to be most admirably adapted for use aboard ships comprises the unit which is somewhat diagrammatically illustrated in Fig. 1 of the drawings and which is shown in detail in Fig. 5. This unit may be placed in the engine room or any other place where it will be conveniently subject to examination and operation. The supply of substantially dried air from such unit will be delivered via the conduit 29 into the common duct 16.

Assuming a given direction of flow of air from the reversible impeller 17, which is connected to a source of power not shown, as the direction indicated by the arrows in Fig. 1, the air is drawn from the starboard side (indicated by 30) of the holds through the ducts 14, risers 15, thence past the impeller 17 into the common duct 16, thence via the risers 15 and ducts 14 into the port side of said holds. As the air is thus circulating in a closed circuit, the dewpoint of said air may be reduced a desired amount by the introduction of a comparatively small amount of relatively dry air through the conduit 29 and the resulting air condition in such a hold will be such as to pervent damage to the cargo or ship by moisture precipitation. It is obviously true that the amount of dry air that is injected will depend upon the period of operation, the relative dryness, and the size of the system used. Ordinarily it is desirable to provide a system which will in normal and substantially continuous operation and in normal climatic conditions serve to provide the proper dewpoint of the air in the hold. The greater the volume of dried air that is injected into the circulation system, obviously the lesser the time that it will take to provide the desired dewpoint. Still, if the unit is too large, the resulting operation costs become impractical. Also a certain factor of safety must be provided so that upon continuous operation the unit will be able to take care of abnormal humidity conditions.

The longitudinal ducts 14, which serve as inlet or outlet ducts, depending upon the direction of flow of air created by the air impeller 17, are also important in the practicing of our invention.

Figure 3:
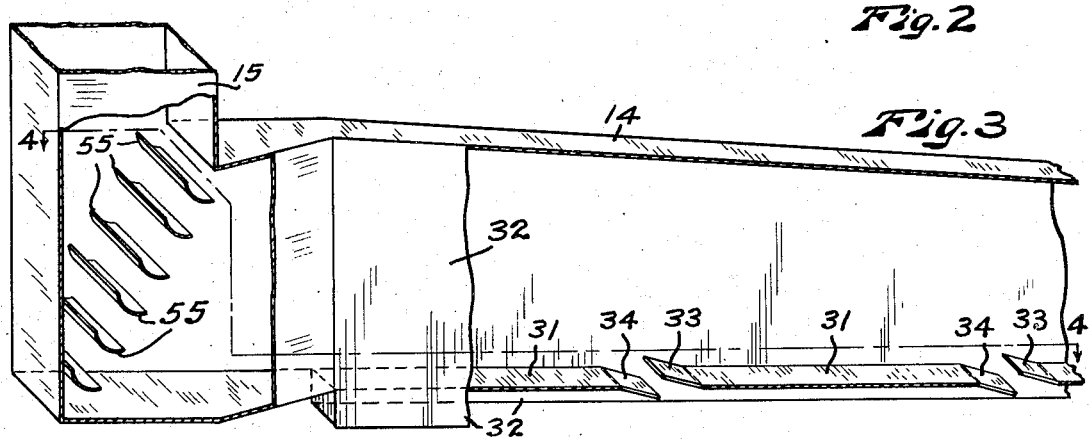
Fig. 3 is a fragmentary perspective view, with parts broken away, of one of the air ducts shown in Fig. 1.

Referring to Fig. 3, the air ducts 14 are of such construction that they may be completely covered by bulk cargo. The bottom plate 31 is so positioned that the sides 32 overhang the bottom plate 31. Longitudinally of the duct 14 openings in the bottom plate 31 are provided. These openings are preferably adjustable. Such adjustment may be readily obtained by cutting substantially an H in the bottom wall 31 and bending one of the members, such as 33, upwardly and the other member, as 34, downwardly. The line of cutting to provide such an adjustable opening is shown in Fig. 4 of the drawings.

The purpose of having the side plate 32 overhang the bottom plate 31 is to provide a substantially longitudinal channel below the bottom plate 31 so that if bulk cargo, such as grain or the like, covers the duct, a longitudinal passageway for air will be provided below the bottom plate 31. The air in such a channel way will diffuse out through the cargo or will be drawn through the cargo into such passageway because of the air circulation provided by air impeller 17. Also by providing such plate 32 overhanging the bottom plate 31, loose grain and the like will not enter into the duct system and close up an opening, such as provided between the members 33 and 34 of the duct 14.

Figure 4:
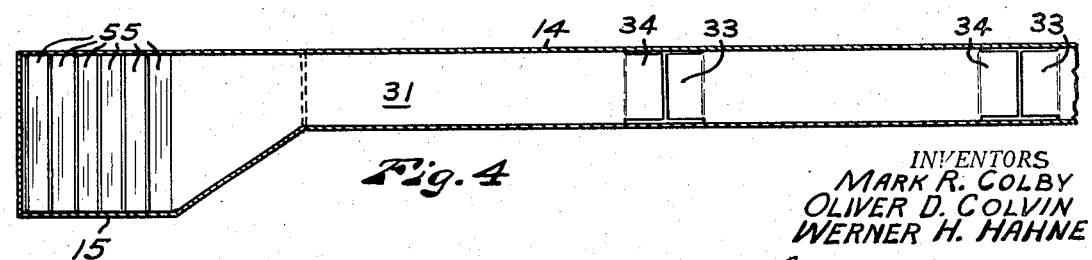
Fig. 4 is a view of the parts shown in Fig. 3 taken substantially on line 4—4 of Fig. 3.

We wish it expressly understood that we do not limit ourselves to the particular construction of the ducts shown in Figs. 3 and 4 of the drawings, as other duct systems may be used, the efficiency of which will permit our invention to be employed with greater or less success.

In the event that the various ducts are connected together with square corners, we preferably provide baffles 55 to reduce the air resistance of such square corners. For example, in Fig. 3, air from duct 14 will be directed by baffles 55 into the riser 15 with more efficiency because of such baffles in accordance with well known principles.

Referring to the air drying unit which we have set forth by way of example in Fig. 5, the same is shown using a moisture absorptive means. As an example of a moisture absorptive means, one particular absorptive agent which may be used is the substance known on the market as silica gel. This agent is capable of absorbing large quantities of water, and the moisture may be freed from the absorptive agent by heating the same, a process generally known as reactivation of the absorptive agent. Other similar absorptive agents which could be used in connection with the apparatus shown in Fig. 5 of the drawings are alumina gel, titania gel, activated charcoal and other similar agents.

A conduit 35 serves to introduce a supply of air to the air drying unit. Preferably the air entering conduit 35 enters through conduit 37, the end of which conduit 37 is placed outside the hold as in the engine room or other suitable place. If it is desired to connect conduit 35 with conduit 37, the three-way valve 36 is positioned as indicated in Fig. 5 of the drawings. The air entering conduit 35 preferably first passes through an air filter 38 which serves to clear the air of impurities, as solids, dust and the like. Any of the well known air filters on the market will readily accomplish the desired purpose. The air filter 38 is provided with a removable cover 39 to permit the air filter 38 to be periodically cleaned or conditioned as desired. After the air leaves the air filter 38 it passes into a blower 40. This blower 40 is suitably connected to a source of power, such as an electric motor 41 and belt 42. The electric motor 41 may be connected to any source of suitable power (not shown). The blower 40 is preferably of a type delivering a positive volume of air, drawing the air out of the air filter 38 and forcing it into the conduit 43. Preferably a safety valve 44 is connected with the conduit 43 to relieve the pressure, should excessive pressure develop because of faulty valve operation in the system. The air under pressure in conduit 43 passes into chamber 45. A distributing cone or baffle 46 diffuses the air entering chamber 45. Preferably means to cool and heat the air in chamber 45 are provided. This cooling means is preferably in the nature of a combination air heater and cooler, which is fluid operated and connectable with a fluid of desired temperature. If it is used as an air cooler, the fluid to be circulated may be a liquid such as sea water. A source of water under pressure is connected with conduit 47. A valve 48 is disposed between conduits 47 and 49. Conduit 49 connects with a conduit 50, which in turn connects with tubes 51. Radiating fins 52 increase the radiating surface of the tubes 51. The tubes 51 connect with a conduit 53, thence through then open valve 54, through conduit 56 and into conduit 57, which may be connected to any convenient overflow. Under most conditions encountered by a ship, sea water may be efficiently used to provide the desired cooling. Should further cooling be desired obviously the system may be readily adapted for use of a recirculated cooled fluid. The unit comprising the cooled tubes 51 and fins 52 will serve as means for lowering the temperature of the air passing thereby. The air leaving chamber 45 passes into the air drying chamber 58. This drying chamber comprises supports 59, which support a screen 60. The screen 60 may comprise a plurality of screens so that a relatively fine mesh obtains. Supported on the screen 60 is the silica gel or other water absorptive agent. In view of the fact that the silica gel supported on screen 60 operates more efficiently at lower temperatures, we preferably provide a cooling unit embedded within the silica gel. This cooling unit is also preferably in the nature of a combination heater and cooler, which is fluid operated and connectable with a fluid of desired temperature. If it is used as a cooler, the fluid to be circulated may be a liquid, such as sea water. This combination unit may comprise a conduit 61 connected with a conduit 50, tubes 62 and radiating fins 63. The tubes 62 and the heat radiating fins 63 thereon preferably take a circuitous route through the bed of silica gel to provide the desired cooling contact area. The tubes 62 are connected with the conduit 64 through the then open valve 65 interposed in conduit 64 and thence into the conduit 57. Similarly a cooled fluid may be recirculated through the system instead of using the sea water as has been described in connection with tubes 51. As the air passes through the silica gel bed resting on screen 60, the moisture in the air will be removed and the air will pass out through conduit 66 through three-way valve 67 into conduit 29. The dry air in conduit 29 is delivered to the common duct 16, see Fig. 1. The conduit 29 is of small diameter and of substantial strength to maintain watertight integrity of the compartment when passing through watertight bulkheads as bulkhead 9. This is likewise true of pipes 72, 76 and 84 hereinafter described.

After the system has operated for such a period of time that the silica gel resting on screen 60 has substantially reached the point of saturation, the silica gel may be reactivated as follows: The three-way valve 67 is operated so that the conduit 66 is connected with conduit 68 and conduit 66 is disconnected from conduit 29. The valve 48 is operated to disconnect the conduit 49 from the source of water supply in conduit 47. The valves 54 and 65 are almost closed and serve as steam traps. The valve 69 is opened and steam under pressure in conduit 70 enters conduit 50. Steam will thereupon pass through the tubes 51 in the chamber 45 and through the tubes 62 in the chamber 58, displacing the water in said tubes so that said tubes and their respective radiating fins will serve as heating devices rather than as cooling devices. The flow of steam will be controlled by the valves 54 and 65 and the condensate will be delivered to conduit 57. Upon heating of the silica gel, the previously absorbed moisture will be carried upwardly by the rising air and will be driven off by way of the conduit 68. The thermometers 71 will indicate the condition of reactivation of the silica gel bed. As the silica gel is being reactivated, a sudden rise in temperature indicated by the thermometers 71 will indicate that the silica gel has been substantially reactivated.

As soon as the silica gel has been substantially reactivated, the three-way valve 67 may be turned, disconnecting said conduit 66 from conduit 68 and connecting said conduit 66 with the conduit 29. Also the valve 69 may be operated to disconnect the source of steam under pressure connected with conduit 70 from the conduit 50. Also the valve 48 may be opened so that the source of water in conduit 47 will be connected with conduit 49. Valves 54 and 65 are opened to provide free circulation of cooling liquid.

In the above we have described a combination heating and cooling unit for drying the material and for the air supply thereto. We do not wish to limit ourselves to the use of such a unit and it is to be understood that other heating means may be substituted therefor, as electric heating means.

As just described, the source of air to be dried enters the air drying unit shown in Fig. 5 from a source external of the hold where the air is to be treated. In this way the supply of air in the closed hold is increased and a positive pressure in the hold, as respects the external atmosphere, is provided, thereby overcoming any tendency of air to leak into the hold from the atmosphere by way of inadvertent or provided openings.

In the event that the operating conditions are such that such a positive pressure is not desired, valves may be operated to merely recirculate the air in the closed hold and dry a certain portion thereof. Referring to Fig. 5 of the drawings the three-way valve 36 is operated so that conduit 35 is disconnected from conduit 37 and such conduit 35 is connected with conduit 72. As shown in Fig. 1 of the drawings, conduit 72 connects with the common duct 16 so a certain portion of the air in the common duct 16 may be drawn out of the common duct 16 by way of the conduit 72, pass through the drying apparatus and the dried air will be delivered from such drying apparatus to conduit 29, and thence back into the common duct 16. Preferably a baffle 73 is disposed in the common duct 16 between the ends of conduits 29 and 72 to prevent the dried air, which is delivered to the common duct 16 by way of the conduit 29, from being drawn into the conduit 72. Under most operating conditions the conduit 72 is preferably not used, but where this conduit may be conveniently provided it will at times be useful.

By the operation of valve 36, the source of air to the drying unit may either be from the closed hold by way of the duct system (conduit 72), or from a source external of such hold (conduit 37). In the first instance the air drying action obtains by the direct removal of moisture from the air recirculating in the common duct 16, thereby reducing the moisture content of such air as respects the volume of such air. In the other instance the volume of the air is increased by the injection into common duct 16 of dry air having its source external of the hold. Again the moisture content of the air being recirculated is reduced as respects the volume of such air. Thereafter moisture in the hold is removed as the air leaks out because of the higher pressure as respects the atmosphere.

Preferably means are provided to adjustably control the supply of dried air without diminishing the supply of air delivered into the common duct 16 by way of the conduit 29. Such adjusting means may be in the nature of a valve 74 disposed in a conduit 75. This conduit 75 connects between conduit 43 and conduit 29. By adjusting valve 74 the desired portion of the air in conduit 43 will bypass the air drying unit and be delivered directly to the conduit 29. Thus, if the air condition in a hold has the desired moisture content, the amount of dried air to be delivered to such a hold may be regulated without dispensing with the provision of a positive pressure in the hold as respects the external atmosphere. As previously explained, this positive pressure will prevent the external atmosphere from leaking into the hold and adversely affecting the moisture content of the air in such a hold.

In the foregoing, we have set forth one type of air drying unit and water absorptive agent which permits economical and practical enjoyment of our invention. Other air drying units and moisture removing means may be used without departing from the spirit of our invention.

The provision of apparatus operating to provide a closed hold with a recirculation of the air in such a closed hold is admirably adapted for use in connection with means to add gases to the air in the hold for fumigating purposes, fire fighting purposes, controlling the ripening of fruit or like purposes therein.

Should the cargo in the hold be a cargo of fruit, and it is desired to treat the air in such a way as to control the ripening of such fruit, gases, such as ethylene or carbon dioxide, may be added to the air to control the ripening process. It has been heretofore well known that fruit, such as bananas, in air treated with certain gases, such as ethylene, ripen faster due to the presence of such ethylene. Also it is well known that the ripening process of such fruit is slowed down under conditions, where certain other gases, as carbon dioxide, are added to the air. Conduit 76 connects between a source of ethylene under pressure, diagrammatically indicated by 77, and with the common duct 16. A valve 78 is disposed in conduit 76 to permit regulation of the quantity of ethylene delivered to the common duct 16. Also a source of carbon dioxide under pressure is provided and is diagrammatically indicated by 79. A conduit 80 connects such source of carbon dioxide 79 with the common duct 16. A valve 81 is disposed in conduit 80 to regulate the flow of carbon dioxide from the source of supply 79 into the common duct 16.

In the event that it is desired to slow up the ripening process of fruit in the hold, the valve 81 may be opened to the desired amount and carbon dioxide will be delivered into the common duct 16. Of course the valve 78 will be closed so that no ethylene is delivered to the common duct 16. On the other hand, if it is desired to speed up or facilitate the ripening of fruit in the hold, the valve 81 will be closed and the valve 78 will be adjusted the desired amount to supply the desired amount of ethylene into the common duct 16. In view of the fact that we provide apparatus resulting in a closed hold and recirculation of the air or gases in such closed hold, the content of desired gases in the air may be effected with a minimum wastage, as any gas added to the air may be recirculated and reused.

Also such a recirculation system provides a duct, which contains air in motion, and which duct is conveniently located so that the hold may be uniformly and efficiently treated with any desired gas.

Fire fighting systems, now used aboard ships, may be more efficiently applied because of our invention. The fire indicator 82 is provided in the usual place for convenient visibility. This fire indicator 82 draws a sample of the air from the common duct 16 by way of conduit 83. By the usual methods, which are no part of this invention, such an indicator will visibly indicate the presence of smoke in the air. If such indicating means are connected with the air being recirculated in the common duct 16, smoke from anywhere in the hold will be indicated by the fire indicating means 82. As an example of a fire extinguishing agent, we have indicated a source of carbon dioxide 79 connected with conduit 80. Conduit 80 connects with common duct 16 and valve 81 is disposed in said conduit 80. Carbon dioxide is an extremely heavy gas and readily tends to settle, unless it is intimately mixed with air. In the previous use of carbon dioxide as a fire extinguishing means aboard ships, the carbon dioxide was delivered into the hold without means to uniformly distribute same. Therefore, the carbon dioxide tended to settle in a layer below the air, thereby being impractical unless the fire were near the bottom of the hold. As distinguished from such mode of operation, when carbon dioxide gas mixes with the air in motion in the common duct 16, it becomes intimately dispersed through the moving air and by reason of the duct system hereinbefore described it becomes substantially uniformly distributed through a hold. By such uniform distribution, fire extinguishing with agents such as carbon dioxide may be more efficiently used, and the location of the fire in the hold is less important than under former fire fighting systems.

The fumigation of the holds of a ship may be more economically and efficiently conducted because of our invention. A source of fumigant under pressure, indicated diagrammatically by 84, connects by conduit 86 with the common duct 16. A valve 85 is provided for controlling the supply of fumigant under pressure. Any desired fumigant may be thus delivered to the common duct 16, recirculated until the desired fumigating effect obtains, and then valves 25 and 26 opened and the supply of fumigant stopped. Thereafter, fresh air will be drawn in by one of the cowls 23 or 24, and the air in the hold delivered out by way of the other of said cowls 23 or 24. The efficiency of fumigating in this manner will greatly surpass present day methods of fumigating, both in obtaining the desired effects from the fumigant in the hold, and in rapidly and positively removing traces of the fumigant after the fumigating operation is over.

The method of operation of our invention may be briefly summarized as follows: The ship's holds are substantially closed to prevent the entrance of external air. Then means are provided for recirculating the air within such a closed hold and substantially between the bounding surfaces of the cargo compartment and the cargo block. This means is preferably provided with a variable speed device so that the flow of air may be governed. This recirculation of air will tend to equalize the temperature of the cargo to that of the vessel, which in turn tends to follow the temperature of the atmosphere as the bounding surfaces of the general cargo compartment are relatively uninsulated and serve to conduct the outside temperature to the said cargo compartment. By governing the flow of air, this tendency of the cargo temperature to equalize to the ship temperature may be regulated. Thus the temperature of the cargo will tend to follow external atmosphere temperature and the cargo is successively conditioned for discharge according to the dewpoint condition at the successive ports of discharge. The means to recirculate the air includes a duct system which preferably draws the air out of a hold along one side thereof and injects air into a hold along an opposite side thereof and provides for circulation of the air adjacent a bounding surface such as one side of the compartment, over the top of the compartment, and adjacent the opposite side of the compartment. This permits maximum use of the cargo space available and provides for efficient recirculation. Our invention permits thwartship circulation of the air in the hold so that frames and thwartship beams do not interfere with but aid in the circulation within the hold. Our invention also provides for relatively dry air adjacent the bounding surfaces of the hold and cargo. In view of the fact that such surfaces are generally metal, which at times will be exceedingly cold, our invention provides a low dewpoint of inside air contacting such metal surfaces, thereby preventing precipitation of moisture by contact therewith. The invention also comprises a particular construction of duct so that bulk cargo may be stowed about the ducts without interfering with the operation of the duct system.

To provide the proper moisture condition of the air within the hold, relatively dry air is injected into the air recirculating system, thereby providing the desired moisture condition. Preferably the source of the air to be dried is external of the hold so that a positive pressure as respects the external atmosphere is provided in the hold, thus overcoming tendencies of leaks around hatch coverings and the like. As an example of an air drying unit, we have set forth a unit involving the use of a water absorptive agent. It is to be understood, however, that this is only set forth by way of example of an air drying means. We have also set forth our invention showing the utility of the same in connection with means to add gases to the air in the hold for fumigating purposes, fire fighting purposes, controlling the ripening of fruit or like purposes therein.

Obviously, changes may be made in the forms, dimensions and arrangement of the parts of our invention, without departing from the principle thereof, the above setting forth only preferred forms of embodiment.

We claim:

1. The method of preventing condensation or sweating in a general cargo compartment and the cargo therein, wherein the bounding surfaces of the cargo compartment provide heat transfer according to external temperature conditions, comprising substantially closing the interior of the compartment from communication with the outside atmosphere; drawing air out of the compartment adjacent one side of the compartment; transferring said air directly to the opposite side of the compartment; circulating said air across the compartment adjacent the top thereof to the first mentioned side; and reducing the moisture content of the said air to a dewpoint below that at which said moisture would be condensed as by contact with the bounding surfaces of the compartment cooled by external temperature conditions.

2. The method of preventing condensation or sweating in a general cargo compartment and the cargo therein, wherein the bounding surfaces of the cargo compartment provide heat transfer according to external temperature conditions, comprising substantially closing the interior of the compartment from communication with the outside atmosphere; drawing air out of the compartment adjacent one side of the compartment; transferring said air directly to the opposite side of the compartment; circulating said air across the compartment adjacent the top thereof to the first mentioned side; and maintaining the moisture content of the said air at a dewpoint below that at which said moisture would be condensed as by contact with the bounding surfaces of the compartment cooled by external temperature conditions.

3. The method of preventing condensation or sweating in a general cargo compartment and the cargo therein, wherein the bounding surfaces of the cargo compartment provide heat transfer according to external temperature conditions, comprising substantially closing the interior of the compartment from communication with the outside atmosphere; drawing air out of the compartment adjacent one side of the compartment; transferring said air directly to the opposite side of the compartment; circulating said air upwardly and adjacent said opposite side; circulating said air adjacent the top of the compartment; circulating said air downwardly and adjacent the said one side of the compartment and thence drawing air out of the compartment as above mentioned; and reducing the moisture content of said air to a dewpoint below that at which said moisture would be condensed as by contact with the bounding surfaces of the compartment cooled by external temperature conditions.

4. The method of preventing condensation or sweating in a general cargo compartment and the cargo therein, wherein the bounding surfaces of the cargo compartment provide heat transfer according to external temperature conditions, comprising substantially closing the interior of the compartment from communication with the outside atmosphere; drawing air out of the compartment adjacent one side of the compartment; transferring said air directly to the opposite side of the compartment; circulating said air across the compartment adjacent the top thereof to the first mentioned side; and reducing the moisture content of the said air to a dewpoint below that at which said moisture would be condensed as by contact with the bounding surfaces of the compartment cooled by external temperature conditions, said reducing of the moisture content of the air being accomplished by injecting a supply of relatively dry air having its source of supply external of said compartment into the air being recirculated, whereby a positive pressure as respects external atmospheric conditions is created in the compartment thereby tending to prevent the admission of air from the atmosphere into the compartment.

5. The method of preventing condensation or sweating in a general cargo compartment and the cargo therein, wherein the bounding surfaces of the cargo compartment provide heat transfer according to external temperature conditions, comprising substantially closing the interior of the compartment from communication with the outside atmosphere; drawing air out of the compartment adjacent to one side of the compartment; transferring said air directly to the opposite side of the compartment; circulating said air upwardly and adjacent said opposite side; circulating said air adjacent the top of the compartment; circulating said air downwardly and adjacent the said one side of the compartment and thence drawing air out of the compartment as above mentioned; and reducing the moisture content of said air to a dewpoint below that at which said moisture would be condensed as by contact with the bounding surfaces of the compartment cooled by external temperature conditions, said reducing of the moisture content of the air being accomplished by injecting a supply of relatively dry air having its source of supply external of said compartment into the air being recirculated, whereby a positive pressure as respects external atmospheric conditions is created in the compartment thereby tending to prevent the admission of air from the atmosphere into the compartment.

6. In apparatus of the class described for preventing condensation or sweating in a general cargo compartment and the cargo therein, wherein the bounding surfaces of the cargo compartment provide heat transfer according to external temperature conditions, means for substantially closing the cargo compartment; an air recirculation duct system for said compartment comprising entrance and exhaust ducts respectively positioned upon opposite sides of said compartment and substantially adjacent the bottom of the compartment, duct means directly connected between said entrance and exhaust ducts, air impeller means recirculating air through said duct system, whereby air will be drawn from said compartment through said exhaust duct, through said duct means, through said entrance duct into the compartment, along one side of the compartment, over the top of the compartment, along the opposite side of the compartment, and back to the exhaust duct; and an air drying means connected with said recirculation duct system reducing the moisture content of the air in said duct system providing a dewpoint of the circulated air in the compartment below the temperature of said bounding surfaces of the cargo compartment and below the temperature of the cargo.

7. In apparatus of the class described for preventing condensation or sweating in a general cargo compartment and the cargo therein, wherein the bounding surfaces of the cargo compartment provide heat transfer according to external temperature conditions, means for substantially closing the cargo compartment; an air recirculation duct system for said compartment comprising entrance and exhaust ducts respectively positioned upon opposite sides of said compartment and substantially adjacent the bottom of the compartment, duct means directly connected between said entrance and exhaust ducts, air impeller means recirculating air through said duct system, whereby air will be drawn from said compartment through said exhaust duct, through said duct means, through said entrance duct into the compartment, along one side of the compartment, over the top of the compartment, along the opposite side of the compartment, and back to the exhaust duct; air drying means; and other air impeller means for said air drying means, said air drying means having an intake external of said compartment and an exhaust connected with said duct system providing a dew-point of the circulated air in the compartment below the temperature of said bounding surfaces of the cargo compartment and below the temperature of the cargo, whereby a positive pressure as respects the external atmospheric conditions is created in the compartment thereby tending to prevent admission of air from the atmosphere into the compartment.

8. In apparatus of the class described, means for substantially closing a marine general cargo compartment from communication with the atmosphere; and air recirculation duct system for recirculating air in the compartment along the bounding surfaces thereof, comprising a horizontal entrance duct along one side of the compartment, a horizontal exhaust duct along the opposite side of the compartment, duct means connected between said entrance and exhaust ducts and air impeller means recirculating air through said duct system, said horizontal ducts comprising a top wall, a bottom wall having spaced apart openings therein, and side walls extending below said bottom wall, whereby bulk grain cargo may be stowed around and above said entrance and exhaust ducts without rendering the same inoperative, and air drying means connected with said recirculation duct system, reducing the moisture content of the air in said air duct system to a dew-point below that at which said moisture would be condensed as by contact with the bounding surfaces of the compartment.

MARK R. COLBY.
OLIVER D. COLVIN.
WERNER H. HAHNE.